Patented Jan. 29, 1924.

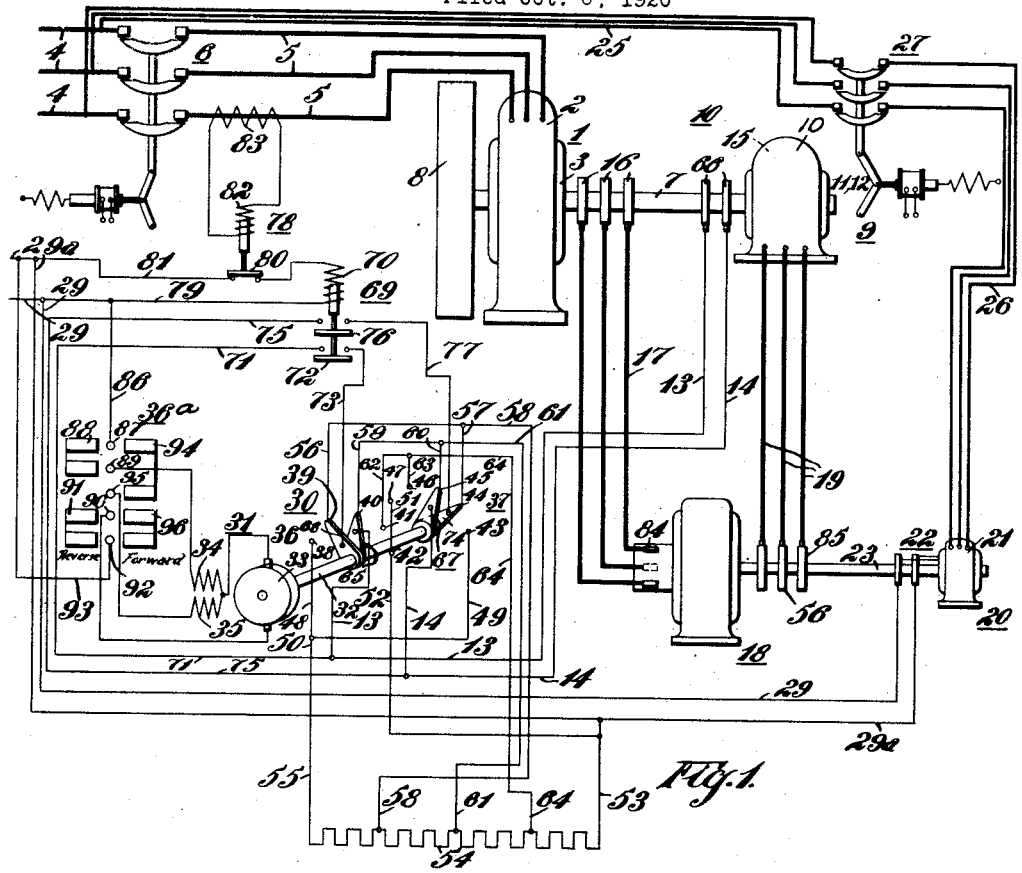

1,481,905

UNITED STATES PATENT OFFICE.

GEORGE W. HUEY, OF WILKINSBURG, PENNSYLVANIA, ASSIGNOR TO WESTINGHOUSE ELECTRIC & MANUFACTURING COMPANY, A CORPORATION OF PENNSYLVANIA.

MOTOR-CONTROL SYSTEM.

Application filed October 6, 1920. Serial No. 414,994.

*To all whom it may concern:*

Be it known that I, GEORGE W. HUEY, a citizen of the United States, and a resident of Wilkinsburg, in the county of Allegheny and State of Pennsylvania, have invented a new and useful Improvement in Motor-Control Systems, of which the following is a specification.

My invention relates to motor-control systems for motors operating under heavy loads such, for example, as induction motors employed to drive machinery in rolling mills.

It is desirable that a motor, for such a system, shall maintain a relatively constant horsepower and, as the motor occasionally increases and decreases in speed, it is necessary that the torque thereof undergo a compensating change.

One of the objects of my invention is to prevent a heavy electrical overload in a main induction motor upon the motor being momentarily retarded because of the extremely heavy operating conditions which it sometimes encounters.

At such times, the motor is subjected to a heavy rush of current and its windings might be impaired thereby if protective means were not provided.

In a motor-control system for rolling-mill operation, a flywheel is provided to smooth out the peak loads. At such times, it becomes highly desirable to so lessen the speed of an induction motor that the flywheel will take the major portion of the load for an interval of time.

For a better understanding of my invention, reference should now be made to the accompanying drawing in which—

Fig. 1 is a diagrammatic view of a motor-control system embodying my invention.

Fig. 2 is a schematic view of a portion of the control system shown in Fig. 1.

Referring to Figs. 1 and 2, an induction motor 1, having a primary member 2 and a secondary member 3, is supplied with electrical energy from the supply conductors 4 through a set of conductors 5 when a three-pole circuit breaker 6 is closed. The induction motor 1 drives a shaft 7 on which is mounted a flywheel or energy-storing device 8. The induction motor 1 is mechanically connected to an auxiliary synchronous dynamo-electric machine or motor 9 having a stator 10 and a rotor 11.

The auxiliary motor 9 has its field-magnet winding 12 wound on the rotor 11 and it is electrically energized by direct current from an external source of energy (not shown) through conductors 13 and 14. An armature winding 15 is mounted on the stator 10 of the auxiliary motor 9 and it may be energized from the secondary member 3 of the induction motor 1, through a set of slip rings 16, a set of conductors 17, a frequency changer 18 and a set of conductors 19, to the armature of the auxiliary motor 9.

A synchronous motor 20 has a stator 21 and a rotor 22, which is mounted upon a shaft 23, by means of which it drives the frequency changer 18 at constant speed. The armature winding of the synchronous motor 20 which is carried by the stator 21, is energized from the supply conductors 4 through sets of conductors 25 and 26, when a circuit breaker 27 is closed. The rotor 22 of the synchronous motor 20 has its field-magnet winding energized from a source of direct current (not shown) through conductors 29 and 29ª.

The strength of the field-magnet winding 12 of the synchronous motor 9 may be varied and the direction of energization thereof changed by a field-rheostat 30, which is driven by a pilot motor 31 mechanically connected thereto by a shaft 32. The motor 31 has an armature 33 and field-magnet windings 34 and 35, for forward and reverse operation, respectively, of the motor 31. The direction of operation of the motor 31 is governed by a controller 36ª which may be operated either manually or electrically.

The rheostat 30 has two sets of contact terminals 36 and 37 mounted back to back. The set of contact terminals 36 comprises contact terminals 38, 39, 40, 41 and 42, and the set of contact terminals 37 comprises contact terminals 43, 44, 45, 46 and 47.

Contact terminals 38 and 43 are electrically connected, by conductors 48 and 49, respectively, to conductor 50 which is connected to the positively energized conductor 29. The contact terminals 42 and 47 are electrically connected to each other by conductors 51 and to the negatively energized conductor 29ª by conductors 52 and 53.

A resistor 54, forming a part of the rheostat 30, is electrically connected to the conductors 29 and 29ª by conductors 55 and 53, respectively.

Contact terminals 39 and 44 are electrically connected, by conductors 56 and 57, respectively, to conductor 58, which is connected to the resistor 54. The contact terminals 40 and 45 are electrically connected, by conductors 59 and 60 respectively, to conductor 61 which is electrically connected to the midpoint of the resistor 54. Contact terminals 41 and 46 are electrically connected, by conductors 62 and 63, respectively, to conductor 64, which is connected to the resistor 54.

Any one of the contact terminals 36 may be engaged by rotating an arm 65 which is securely mounted on the shaft 32 and is electrically connected to the field-magnet winding 12 of the synchronous motor 9 by conductor 13 and one of the slip-rings 66. An arm 67 securely mounted on the shaft 32, engages the contact terminals 43, 44, 45, 46 and 47, according to its position. It is electrically connected to the field-magnet winding 12 of the synchronous motor 9 by conductor 14 and one of the set of slip-rings 66.

An auxiliary arm 68 is mechanically connected to the arm 65 and is actuated simultaneously with it by the shaft 32. When a contactor 69, having an actuating coil 70, is closed, the arm 68 is electrically connected to the field-magnet winding 12 of the synchronous motor 9 through the slip rings 66 by conductors 13 and 71, contact member 72 of the contactor 69 and conductor 73.

An auxiliary arm 74 is mechanically connected to the arm 67 and is actuated simultaneously with it by the shaft 32. The arm 74 is electrically connected to the field-magnet winding 12 of the synchronous motor 9, when the contactor 69 is closed, through one of the slip rings 66, by conductors 14 and 75, contact member 76 of the contactor 69, and conductor 77.

The actuating coil 70 of the contactor 69 is energized, when a relay 78 is closed, by a circuit established from conductor 29 through conductor 79, actuating coil 70 of the contactor 69, contact member 80 of the relay 78 and conductor 81 to conductor 29ª. The relay 78 has an actuating coil 82 which is electrically connected to a transformer 83. The transformer 83 is in series with one of the conductors 5, which energizes the primary member 2 of the induction motor 1. The relay 78 is adjusted to close when there is a very heavy rush of current through the conductor 5.

The main induction motor 1 is started by closing the circuit breaker 6 which energizes the primary member 2 thereof. The secondary member 3 of the motor 1 is first connected in series with a resistor (not shown) and, after the motor 1 has attained a predetermined speed, the secondary member 3 is connected directly to the commutator 84 of the frequency changer 18 by means of slip rings 16 and conductors 17. The induced current of the secondary member 3 of the motor 1 passes through the commutator 84, the frequency changer 18, the slip rings 85 thereof and set of conductors 19 to armature winding 15 of the synchronous motor 9.

The armature 15 of the synchronous motor 9 has the same number of poles as the secondary member 3 of the induction motor 1; therefore, the frequency of the voltage through the armature 15 is equal to the speed of the secondary member 3 of the motor 1, with which it is mechanically connected. As the frequency changer 18 is operated at synchronous speed by the synchronous motor 20, the slip frequency of the voltage in the secondary member 3 of the induction motor 1 is the same number of cycles as the difference between the number of cycles of the armature 15 of the motor 9 and the synchronous speed of the frequency changer 18.

When the synchronous motor 9 is operating above synchronous speed, it becomes a generator and supplies electrical energy to the secondary member 3 of the induction motor 1, thereby causing the motor 1 to decrease its speed.

If the synchronous motor 9 is operated below synchronism, because of the decrease in the speed of the induction motor 1, at which time a voltage occurs substantially greater than is needed to produce the normally required current flow in the secondary member 3 of the motor 1, the armature 15 of the synchronous motor 9 will consume a portion of the surplus electrical energy from the secondary member 3. The increased voltage across the armature 15 of the motor 9 will increase its torque on the shaft 7, thereby assisting the main motor 1.

The voltage across the armature 15 of the synchronous motor 9 may be varied by changing the voltage in its field-magnet winding 12. The maximum voltage of the field-magnet winding 12 is equal to the voltage drop across the resistor 54 of the field rheostat 30, and the minimum voltage, which, in this case, is zero voltage, is obtained by completely shunting the field-magnet winding 12. The winding 12 may be completely shunted by bringing the arm 65 of the rheostat 30 to the contact terminal 40 and, as the arms 65 and 67 are securely mounted on the shaft 32, the arm 67 at the same time will engage the contact terminal 45 (see Fig. 2). By continuing the movement of the shaft 32 until the rheostat arms 65 and 67 engage contact terminals 42 and 43, respectively, a voltage equal to the difference in potential of the two ends of the resistor 54 is effected in the field-magnet winding 12 of the synchronous motor 9. It is apparent, however, that, in this position, the winding 12 is energized in a reverse direction to that secured when the rheostat arms 65 and 67 engage the contact terminals 38 and 47, respectively.

The speed of the induction motor 1 may be varied by varying the voltage across the armature 15 of the synchronous motor 9. If the energization of the field-magnet winding 12 of the motor 9 is weakened, the rotor 11 on which it is mounted tends to increase its speed and thus draw more power through the armature 15 of the motor 9 from the supply conductors 19. If more electrical energy is drawn from the conductors 19, a greater load is placed on the secondary member 3 of the induction motor 1, thus tending to cause the motor 1 to decrease its speed.

The field rheostat 30, which controls the strength of the field-magnet winding 12 of the motor 9, is actuated by the motor 31. The motor 31 may be operated in a forward direction by actuating the controller 36ª to its forward position, thereby establishing a circuit from the positively energized conductor 86, contact terminal 87, contact segment 88, contact terminal 89, field-magnet winding 34 of the motor 31, armature 33, contact terminal 90 of controller 36 and contact segment 91 and contact terminal 92 to the negatively energized conductor 93.

The motor 31 may be operated in a reverse direction by actuating the controller 36 to its reverse position, thereby establishing a circuit from the positively energized conductor 86, through contact segment 94, contact terminal 95, field-magnet winding 35 of the motor 31, armature 33, contact terminal 90 of the controller 36, contact segment 96 and contact terminal 92, to the negatively energized conductor 93.

If there is an abnormal load upon the induction motor 1, it may be some time before the controller 36 is so operated that the motor 31 will actuate the field rheostat 30, to decrease the strength of the field-magnet winding 12 of the synchronous motor 9 and thus reduce the electrical stress upon the induction motor 1.

By means of my invention, protection is provided for the induction motor 1 operating under abnormal conditions by rapidly diminishing the energization of the field-magnet winding 12 of the motor 9. This is accomplished by the series transformer 83 energizing the actuating coil 82 sufficiently to open the contactor 78. When the contactor 78 is open, the actuating coil 70 of the contactor 69 is de-energized and the contactor 69 opens.

The auxiliary bridging arms 68 and 74 of the rheostat 30 are electrically connected to the field-magnet winding 12 of the synchronous motor 9 by circuits comprising contact members 72 and 76, respectively, of the contactor 69, as has been previously described. When the contactor 69 is opened, the circuits comprising the auxiliary arms 68 and 74 are broken, thereby decreasing the shunted voltage drop across the portion of the resistor 54 that is connected in parallel with the field-magnet winding 12 and thus decreasing the voltage across the winding 12, provided that the arm 65 engages one of the contact terminals 38 to 40.

It is apparent, upon inspection of Fig. 2, that the opening of the contactor 69 will not weaken the field-magnet winding 12 of the motor 9 when the arm 68 is between the central contact terminal 40 and the negative contact terminal 42. For clearness, only a few contact terminals have been shown, and, with a larger number of contact terminals, the auxiliary circuits comprising the auxiliary arms 68 and 74 of the rheostat 30 would not control such relatively large portions of the resistor 54 as are shown in Figs. 1 and 2 of the drawing.

When the energization of the field-magnet winding 12 of the motor 9 is diminished, the induction motor 1 is retarded by the synchronous motor 9, since the latter receives additional current from the secondary member 3 of the motor 1 and thus allows the flywheel 8 to take the peak load. As soon as the peak load passes, the series transformer 83 and the actuating coil 82, which is energized therefrom, are sufficiently de-energized to permit the relay 78 to assume its normal or closed position.

When the relay 78 is closed, the actuating coil 70 of the contactor 69 is energized and the contactor 69 is closed. When the contactor 69 is closed, the auxiliary arms 68 and 74 are again electrically connected to the field-magnet winding 12 of the synchronous motor 9, and the voltage across the winding 12 is increased.

As soon as the energization of the field-magnet winding 12 has been increased, the synchronous motor 9 tends to decrease its speed and thus the armature 15 of the motor 9 requires less current. By diminishing the current consumed by armature 15 of the motor 9, the voltage required by the secondary member 3 of the motor 1 is decreased and the motor 1 will increase its speed.

It is apparent that apparatus constructed in accordance with my invention is effective and relatively simple in operation, and that the main driving motor is protected from both mechanical and electrical overloads when the working conditions become abnormally heavy. This is accomplished by permitting the flywheel or other energy-storing device to take the mechanical overload and by the synchronous motor consuming the excess voltage induced in the secondary member of the main motor when the speed of the main motor is retarded.

While I have shown my invention in a preferred form, it is apparent that modifications in the arrangement of circuits and apparatus employed, may be made without departing from the spirit thereof. I desire, therefore, to be limited only by the scope of the appended claims.

I claim as my invention:

1. The combination with a motor having a field-magnet winding and a resistor, of means for electrically connecting said winding to said resistor, said means being operable to reverse the voltage across said winding by connecting said winding to certain portions of said resistor, and means for shunting an additional portion of said resistor.

2. The combination with a motor having a winding and a rheostat comprising a resistor for controlling the strength and direction of energization of said winding, of a contactor for controlling the energization of said winding by varying the effective value of said resistor.

3. The combination with a motor having a winding and a rheostat comprising a resistor for controlling the strength and direction of energization of said winding, of a contactor for partially de-energizing said winding by varying the effective value of said resistor, and means controlled by the electrical condition of said motor for automatically operating said contactor.

4. The combination with a motor, of an auxiliary dynamo-electric machine provided with a winding mechanically connected thereto, said auxiliary machine being adapted to operate as a motor while said motor is running below normal speed and as a generator when said motor is running above normal speed, and automatic means comprising a rheostat responsive to the load on said motor for decreasing the speed of said motor by controlling the energization of the winding of said machine.

5. The combination with an induction motor, of an auxiliary dynamo-electric machine mechanically connected thereto and having a field-magnet winding, said machine serving to assist said induction motor to develop torque during the operation of said motor at normal speed and effecting a decrease in the torque exerted by said motor during the operation of said motor above normal speed, means for controlling the strength and direction of energization of said winding of said machine during normal operating conditions, and means responsive to the electrical condition of said motor for varying the energization of said winding of said machine during abnormal load conditions upon said motor.

6. The combination with a variable-speed motor, of a machine rigidly coupled thereto for furnishing the additional torque required during the operation of said motor below normal speed and for consuming the excess torque developed by said motor during the operation of said motor above normal speed, automatic means responsive to abnormal electrical conditions of said motor for retarding said motor by controlling the value of the current supplied by said machine to said motor.

7. The combination with a main induction motor having a primary and a secondary member, of an auxiliary dynamo-electric machine coupled thereto and having an armature and a field-magnet winding, a frequency changer adapted to be connected between the armature of said auxiliary machine and the secondary of said induction motor, means for varying the strength of said field-magnet winding of said auxiliary machine in accordance with the load on said motor, and automatic means for varying the strength of said field-magnet winding of said machine during abnormal current conditions in said primary member.

8. The combination with a main induction motor and an energy-storing device operated thereby, of an auxiliary dynamo-electric machine mechanically connected thereto, said auxiliary machine being adapted to operate as a motor during the operation below normal speed of said induction motor and being adapted to operate as a generator during the operation above normal speed of said motor, and automatic means for momentarily reducing the speed of said motor during abnormal current conditions therein to permit said energy-storing device to perform the greater portion of the work.

9. The combination with a main induction motor having a primary and a secondary member, of an auxiliary dynamo-electric machine coupled thereto and having an armature and a field-magnet winding, a frequency changer adapted to be connected between said armature of said auxiliary machine and the secondary of said induction motor, means for controlling the strength and direction of energization of said field-magnet winding of said auxiliary machine, and means controlled by abnormal current conditions in the primary member of said induction motor for decreasing the strength of said field-magnet winding of said machine.

10. The combination with a main induction motor having a primary and a secondary member, of a synchronous motor mechanically connected thereto and having a field-magnet winding and an armature, an energy-storing device operated by said induction motor, a frequency changer adapted to be connected between the armature of said synchronous motor and the secondary of said induction motor, a rheostat capable of changing both the direction and the strength of the current in said field-magnet winding of said synchronous motor, a contactor for changing the resistance of said rheostat to weaken said field-magnet winding of said machine, and means comprising a transformer for operating said contactor during abnormal electrical conditions in said main motor.

11. The combination with a motor having a winding and a rheostat comprising a resistor for controlling the strength and direction of energization of said winding, of a contactor for increasing the energization of said winding by shunting a portion of said resistor.

12. The combination with a motor having a winding, and a source of power for said motor, a rheostat comprising a resistor for controlling the strength and direction of energization of said winding, of a contactor for increasing the energization of said winding by shunting a portion of said resistor, and means controlled by said source of power for automatically operating said contactor.

In testimony whereof, I have hereunto subscribed my name this 29th day of September, 1920.

GEORGE W. HUEY.